(12) United States Patent
Schwar

(10) Patent No.: US 7,167,627 B2
(45) Date of Patent: Jan. 23, 2007

(54) SUBSTRATE WITH ATTACHED FILAMENTARY MEMBERS

(75) Inventor: Ronald C. Schwar, Allentown, PA (US)

(73) Assignee: SKH Technologies LLC, Perkasie, PA (US)

( * ) Notice: Subject to any disclaimer, the term of this patent is extended or adjusted under 35 U.S.C. 154(b) by 199 days.

(21) Appl. No.: 10/997,101

(22) Filed: Nov. 24, 2004

(65) Prior Publication Data

US 2005/0100304 A1    May 12, 2005

Related U.S. Application Data

(62) Division of application No. 10/614,766, filed on Jul. 8, 2003, now Pat. No. 6,913,454.

(51) Int. Cl.
*G02B 6/36* (2006.01)

(52) U.S. Cl. ...................................... 385/137; 385/138

(58) Field of Classification Search ........ 385/136–139, 385/147; 112/1, 429
See application file for complete search history.

(56) References Cited

U.S. PATENT DOCUMENTS

| | | | | |
|---|---|---|---|---|
| 3,973,296 A * | 8/1976 | Peterson | ..................... | 24/114.7 |
| 4,093,491 A | 6/1978 | Whelpton et al. | .......... | 156/309 |
| 4,110,818 A | 8/1978 | Hempsey | ..................... | 362/32 |
| 4,234,907 A | 11/1980 | Daniel | ......................... | 362/32 |
| 4,242,158 A | 12/1980 | Olson | ........................... | 156/92 |
| 4,854,250 A | 8/1989 | Stüvecke et al. | ......... | 112/80.16 |
| 4,875,144 A | 10/1989 | Wainwright | ................ | 362/103 |
| 5,006,197 A | 4/1991 | Newkirk et al. | ............ | 156/514 |
| 5,425,831 A | 6/1995 | Grimes et al. | .............. | 156/179 |
| 5,430,819 A * | 7/1995 | Sizer et al. | .................... | 385/59 |
| 5,437,750 A | 8/1995 | Rinse et al. | ................ | 156/73.1 |
| 5,593,425 A * | 1/1997 | Bonutti et al. | .............. | 606/232 |
| 5,738,753 A | 4/1998 | Schwar et al. | ........... | 156/379.8 |
| 5,858,161 A | 1/1999 | Nakajima et al. | ........... | 156/293 |
| 5,881,206 A | 3/1999 | Schwar et al. | .............. | 385/147 |
| RE36,231 E | 6/1999 | Rondeau | ...................... | 385/81 |
| 5,941,185 A | 8/1999 | Selbach et al. | .......... | 112/80.16 |
| 6,151,439 A | 11/2000 | Wainwright | ................ | 385/147 |
| 6,217,188 B1 | 4/2001 | Wainwright et al. | ........ | 362/103 |
| 6,320,997 B1 * | 11/2001 | Dautartas et al. | ............. | 385/19 |
| 6,382,825 B1 | 5/2002 | Wainwright | ................ | 362/576 |
| 6,413,341 B1 | 7/2002 | Wainwright | ................ | 156/93 |

* cited by examiner

*Primary Examiner*—John D. Lee
(74) *Attorney, Agent, or Firm*—Synnestvedt & Lechner LLP

(57) ABSTRACT

A substrate having attached filamentary members is disclosed. The substrate includes a plastic layer and the apparatus for attaching the filamentary member includes an anvil, a needle and a swaging tool movable relatively to the anvil. The method of attachment includes the steps of penetrating the substrate with the needle to create an opening, positioning the filamentary member in the opening, and compressing the substrate between the swaging tool and the anvil so as to deform the plastic layer and swage the filamentary member to the substrate. The needle is heated to melt the plastic layer so that it fuses with the filamentary member upon swaging.

11 Claims, 15 Drawing Sheets

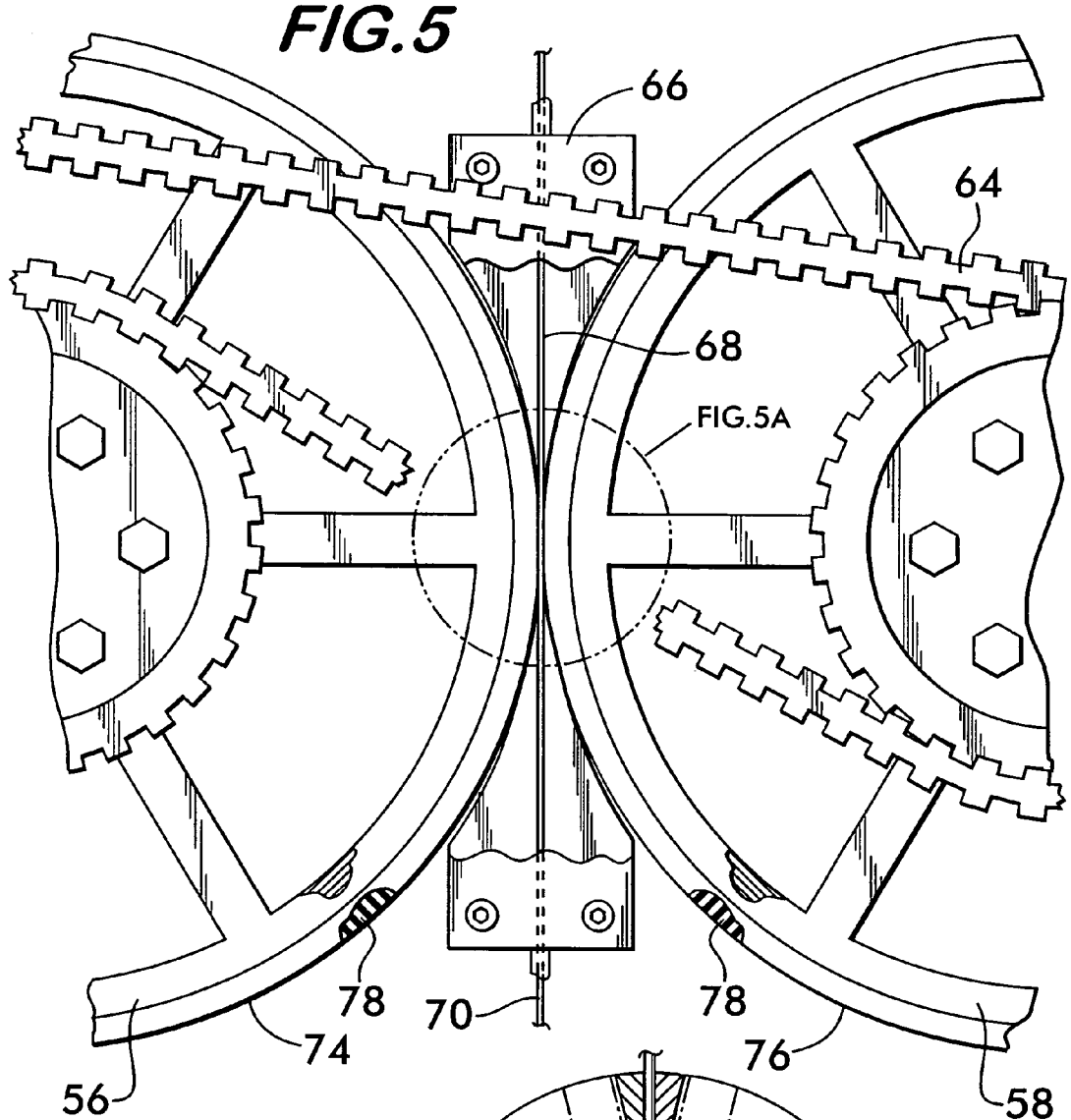
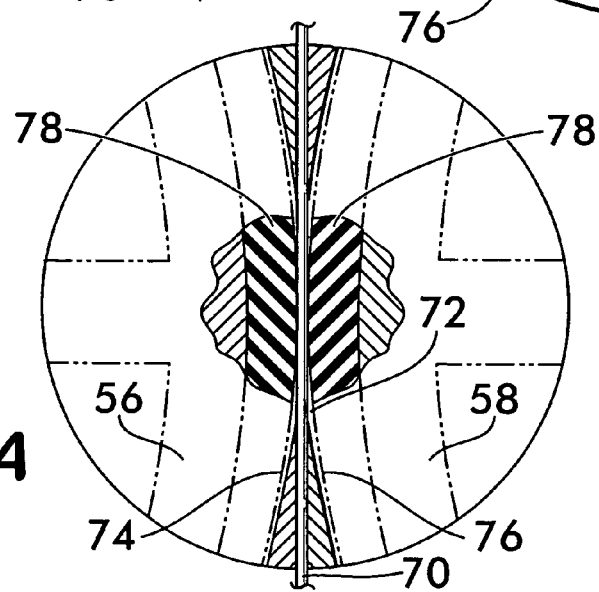

SUBSTRATE WITH ATTACHED FILAMENTARY MEMBERS

CROSS-REFERENCE TO RELATED APPLICATIONS

The present application is a divisional of U.S. application Ser. No. 10/614,766, filed on Jul. 8, 2003 (now U.S. Pat. No. 6,913,454, issued on Jul. 5, 2005).

FIELD OF THE INVENTION

This invention concerns a substrate with attached filamentary members and a device and a method for attaching filamentary members, particularly optical fibers, to a substrate.

BACKGROUND OF THE INVENTION

Various methods and devices are available for attaching optical fibers to a substrate in a particular pattern which becomes visible when the optical fiber ends are illuminated. Such patterns may form merely decorative devices as well as trademarks associated with advertising a particular product or service or other words, phrases or symbols associated with or promoting an organization, event or thing. The substrate to which the optical fibers are attached could be a banner or a part of an article of clothing such as a hat or a coat. The optical fibers and their associated illuminating means (typically battery powered light emitting diodes) are hidden within a lining or on the inside of the garment or on a reverse side of the banner with only the illuminatable ends visible on an outwardly facing surface of the substrate.

Disadvantages associated with current devices and methods for attaching optical fibers to substrates include the slowness of the procedures and their use of an adhesive to fix the optical fiber to the substrate. Devices currently available require on the order of six seconds per attachment and use liquid adhesives cured by exposure to ultraviolet light. The use of liquid adhesive complicates the attachment device and method and increases the cost of production due to the use of a relatively expensive consumable (the adhesive) which must be constantly replenished. The relatively long duration of time required to attach each fiber makes complicated designs requiring many fibers impractical for economic mass production. There is clearly a need for improved machines and methods of attachment of filamentary members, such as optical fibers, to a substrate.

SUMMARY AND OBJECTS OF THE INVENTION

The invention concerns an apparatus for attaching a filamentary member to a substrate having a plastic layer. In a preferred embodiment, the apparatus comprises a support surface positionable facing the substrate and engageable with it. A needle is movable relatively to the substrate and adapted to penetrate it and form an opening therethrough. The opening is positionable adjacent to the support surface. Preferably, the support surface is fixed and the needle is movable through an aperture located in the support surface.

A swaging tool having a swaging surface is positioned with the swaging surface facing the support surface. The swaging tool and the support surface are movable relatively to one another so as to compress the substrate between the swaging surface and the support surface. Preferably, the swaging tool moves relative to the support surface. The swaging tool has a passageway therein for receiving the filamentary member. The passageway is alignable with the opening in the substrate formed by the needle. The filamentary member is positionable through the passageway and into the opening. When the substrate is compressed between the support surface and the swaging tool, the swaging surface deforms a portion of the plastic layer around the opening so as to swage the filamentary member to the substrate.

Preferably, a heater is mounted on the needle, the needle being heated and melting the portion of the plastic layer upon forming the opening in the substrate.

It is convenient to include an outer sleeve positioned within the aperture through the support surface. The outer sleeve has a lengthwise oriented bore for receiving the needle therein. The outer sleeve is movable relatively to the needle to extend outwardly from the support surface and penetrate the substrate layer along with the needle. The bore of the outer sleeve forms a guide for directing the filamentary member into the opening in the substrate when the needle and the outer sleeve have penetrated the substrate and the needle is moved away from the substrate relatively to the outer sleeve.

It is also preferable to use a stripper tube having a lengthwise bore therethrough. The swaging tool is positioned within the stripper tube bore and is movable relatively thereto. The stripper tube is movable relatively to the support surface and has an end engageable with the substrate for separating the substrate from the swaging tool when the swaging tool is moved away from the substrate relatively to the stripper tube.

Motion of the stripper tube, swaging tool, needle and outer sleeve is preferably coordinated by cams. In practice, the apparatus includes a first cam rotatable about a first axis and a first cam follower engaging the first cam and mounted on the stripper tube. The first cam moves the stripper tube toward and away from the support surface as it rotates. The apparatus also includes a second cam rotatable about a second axis and a second cam follower engaging the second cam and mounted on the swaging tool. The second cam moves the swaging tool toward and away from the support surface. A third cam, rotatable about a third axis, cooperates with a third cam follower mounted on the needle. The third cam moves the needle through the aperture in the support surface to extend from or retract the needle beneath the support surface. The cams are shaped and rotated so as to coordinate the relative motion of the stripper tube, the needle and the swaging tool for swaging the filamentary member to the substrate.

The apparatus may also comprise a fourth cam rotatable about a fourth axis and cooperating with a fourth cam follower mounted on the outer sleeve surrounding the needle. The fourth cam moves the outer sleeve through the aperture to extend from or retract beneath the support surface in cooperation with the needle, the stripper tube and the swaging tool. Note that the various cam axes may be distinct from one another or coincident, as they merely serve to illustrate the axis of rotation of the various cams.

The apparatus also preferably includes a pair of nip rollers mounted for rotation in opposite directions and having respective circumferential surfaces engaging the filamentary member on opposite sides thereof. The rollers are positioned above the swaging tool and, upon rotation, feed the filamentary member through the passageway of the swaging tool and into the opening in the substrate.

It is convenient to use a frame for supporting the substrate. The frame is positioned between the support surface and the stripper tube and is movable transversely thereto for positioning a predetermined location on the substrate beneath the swaging tool for attachment of the filamentary member at the predetermined location.

The invention also contemplates a method of attaching a filamentary member to a substrate having a plastic layer. The method comprises the steps of:

(A) forming an opening through the substrate at a predetermined location on the substrate;

(B) inserting the filamentary member through the opening; and (C) deforming a portion of the plastic layer surrounding the opening into contact with the filamentary member.

In the method according to the invention, the deforming step includes swaging the portion of the plastic layer. The swaged portion is preferably formed into a conical shape surrounding the filamentary member. The deforming step may also include melting the portion of the plastic layer prior to or during swaging or otherwise deforming the layer. The deforming step may also include fusing the portion of the plastic layer to or with the filamentary member.

The invention also includes a substrate having a filamentary member attached according to the invention. The substrate comprises a plastic layer and a filamentary member extending transversely through the substrate and attached thereto by deforming a portion of the plastic layer surrounding the filamentary member into contact with the filamentary member.

It is an object of the invention to provide an apparatus that can attach filamentary members to a substrate rapidly and precisely.

It is another object of the invention to provide an apparatus that is relatively simple to program and operate.

It is yet another object of the invention to provide a method for attaching a filamentary member to a substrate that does not use an adhesive.

It is still another object of the invention to provide a method for attaching a filamentary member to a substrate which is inexpensive.

It is again another object of the invention to provide a method for attaching a filamentary member to a substrate that provides a relatively high pull-out load between the filamentary member and the substrate.

It is also another object of the invention to provide an article wherein filamentary members are attached to a substrate.

These and other objects and advantages of the invention will become apparent upon consideration of the drawings and following detailed description.

BRIEF DESCRIPTION OF THE DRAWINGS

FIG. 5 is a view on an enlarged scale of a portion of the apparatus shown in FIG. 3;

FIG. 5A is a detailed view on an enlarged scale of a portion of FIG. 5 within the broken circle;

DETAILED DESCRIPTION OF THE PREFERRED EMBODIMENTS

Figure 1:
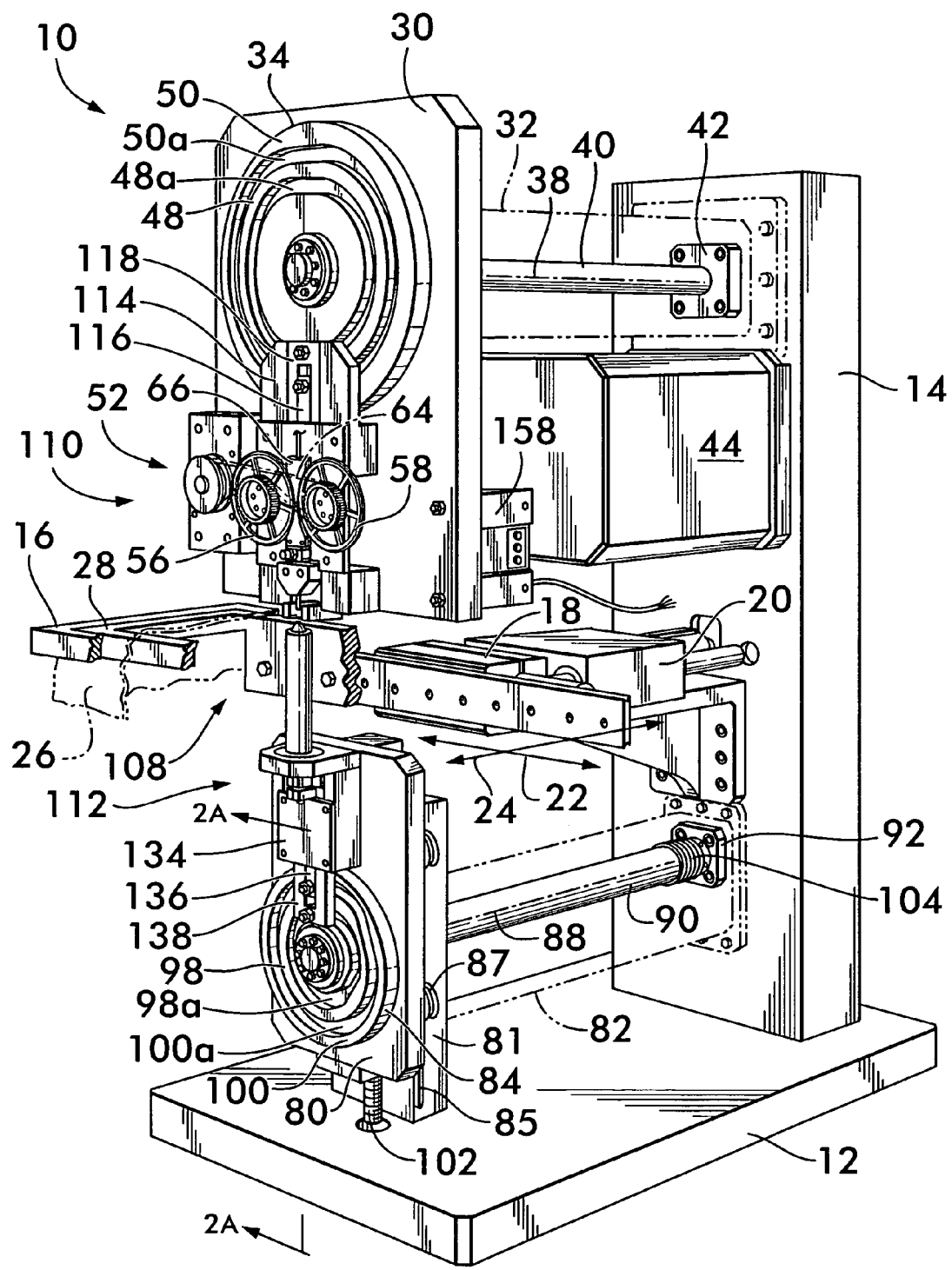
FIG. 1 is a perspective view of an apparatus for attaching filamentary members to a substrate according to the invention.

FIG. 1 shows an apparatus 10 for attaching filamentary members to a substrate according to the invention. Apparatus 10 has a base 12 on which is mounted a stanchion 14. An x-y table 16 is mounted on stanchion 14, the table having an x-direction actuator 18 and a y-direction actuator 20 for moving the table transversely in the x and y directions as defined by arrows 22 and 24. Table 16 may take any practical form necessary to hold a substrate 26 (shown in broken line) to which filamentary members are to be attached, the table being shown by way of example as a tentering frame 28 mounted on the actuators 18 and 20 for tensioning and positioning the substrate 26 for presentation to the filamentary member insertion assembly described below.

Figure 2:
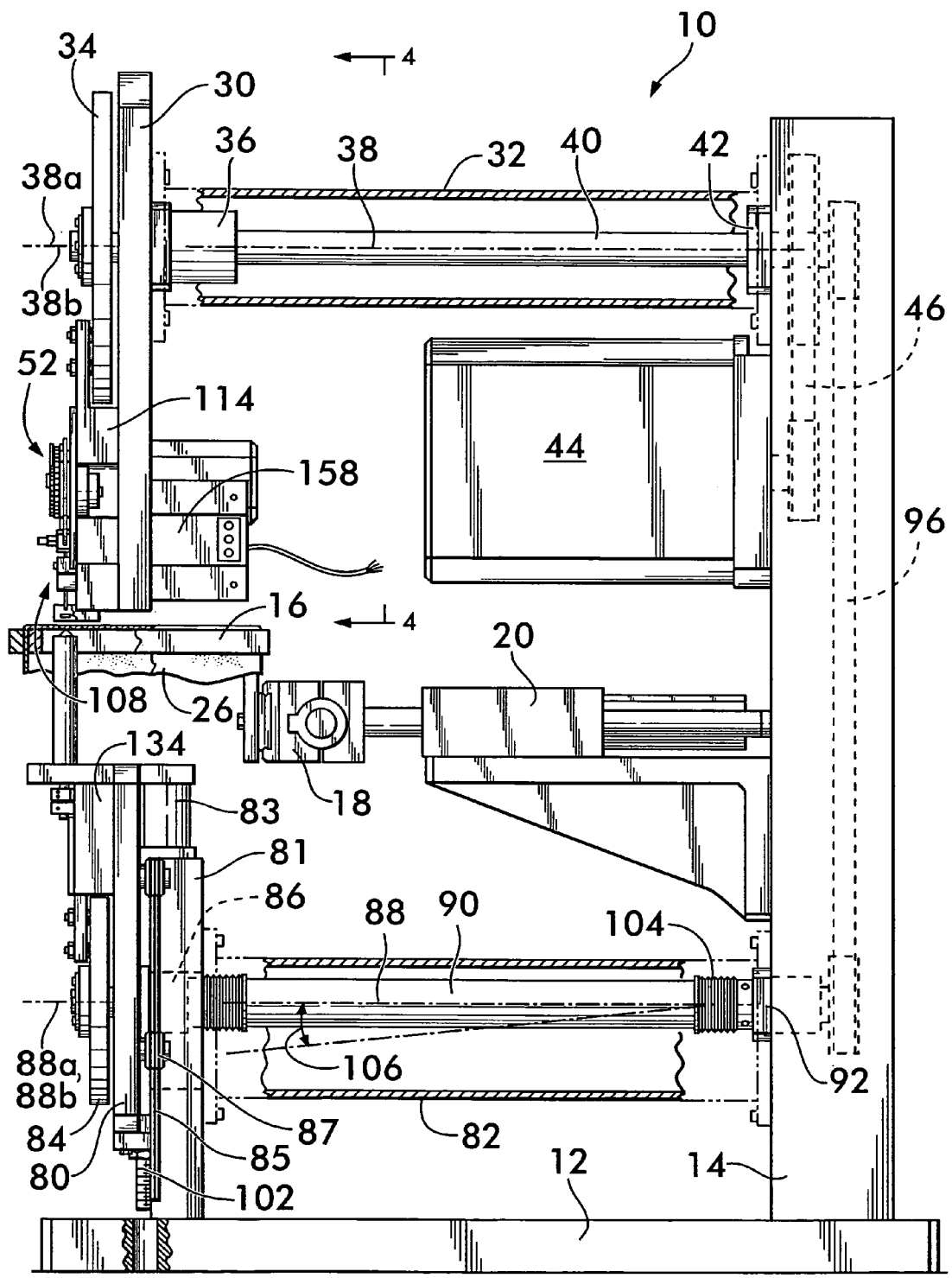
FIG. 2 is an elevational view of the apparatus shown in FIG. 1.

An upper mounting plate 30 is attached to stanchion 14 and positioned above x-y table 16 via a horizontally extending beam 32, shown in broken line. An upper cam wheel 34 is mounted on the upper mounting plate. As best shown in FIG. 2, the upper cam wheel 34 is mounted in a bearing 36 for rotation about an axis 38. An upper drive shaft 40 is connected to the upper cam wheel 34 and extends through beam 32 from bearing 36 to another bearing 42 mounted within the stanchion 14. An electric motor 44, also preferably mounted on the stanchion 14 powers the upper drive shaft 40 via a drive belt assembly 46 positioned within stanchion 14 and shown in hidden line. Other means of powering the drive shaft, such as a geared transmission or direct motor drive are also feasible.

Figure 3:
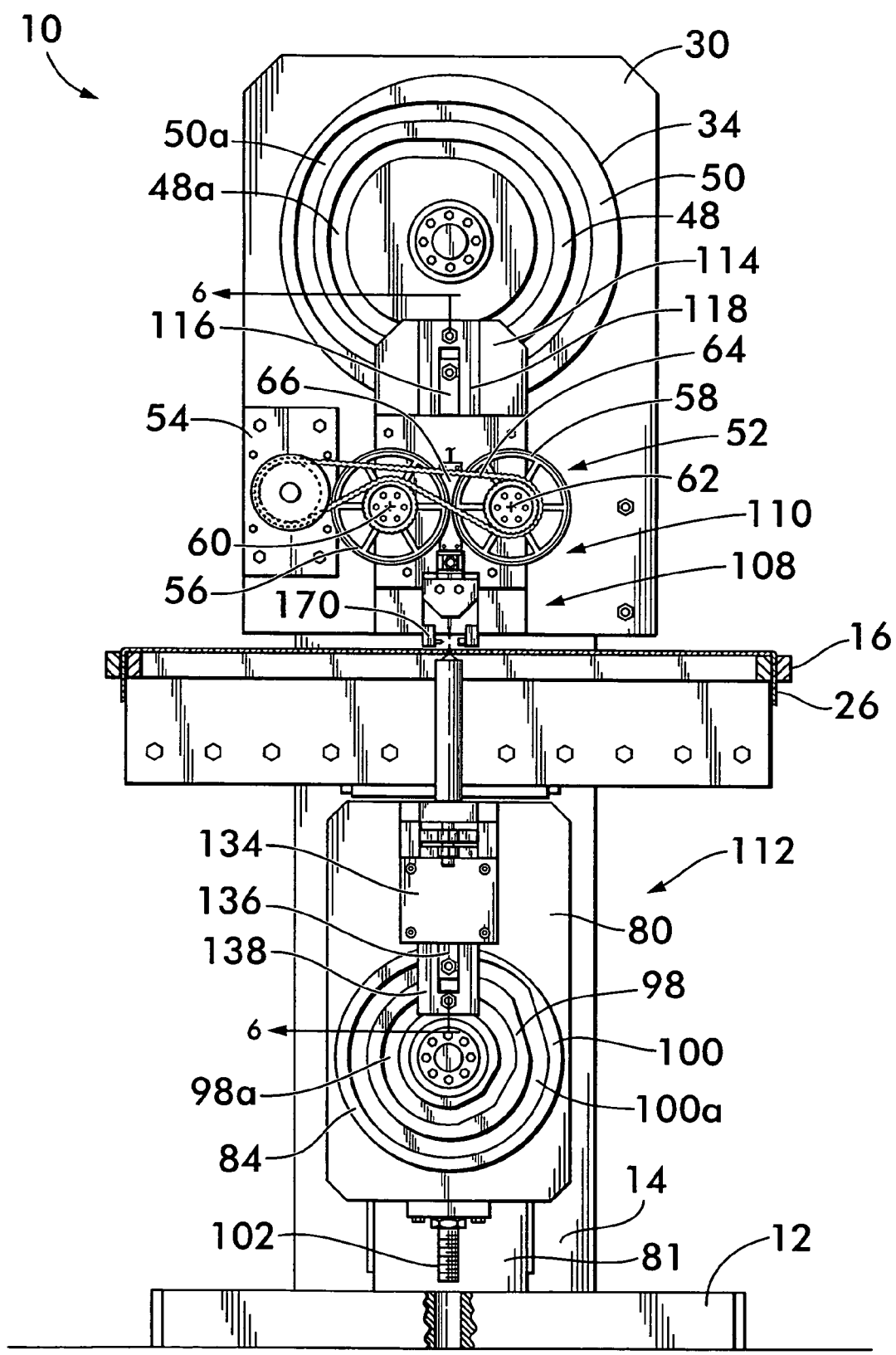
FIG. 3 is a front view of the apparatus shown in FIG. 1.

As best shown in FIG. 3, upper cam wheel 34 comprises two upper cams 48 and 50, defined by cam surfaces which appear respectively as non-circular grooves 48a and 50a in the upper cam wheel 34. Cams 48 and 50 rotate about respective axes of rotation 38a and 38b, best shown in FIG. 2. The axes coincide with one another and with the axis 38 of the upper cam wheel 34 since both cams 48 and 50 are mounted on the cam wheel 34. However, the cams could also be independently mounted, in which case, the axes of rotation might not be coincident. As described below, cam followers of various reciprocating components of the filamentary member insertion assembly ride in the grooves 48a and 50a, the shape of the grooves and their angular relation to one another coordinating the relative movements of the reciprocating components of the filamentary member insertion assembly.

FIG. 3 also shows the filamentary member feed assembly 52 which is mounted on the upper mounting plate 30. Feed assembly 52 comprises an electric motor 54 (see also FIG. 4) which turns two nip rollers 56 and 58 about respective axes of rotation 60 and 62 which are substantially parallel to each other and perpendicular to the upper mounting plate 30. A belt drive 64 extends from the motor and is configured to simultaneously rotate both nip rollers in opposite directions.

A filament guide block 66 is positioned between the nip rollers 56 and 58. As shown on an enlarged scale in FIG. 5, the filament guide block 66 is contoured to complement the shape of the nip rollers 56 and 58 and allow them to be positioned closely adjacent to each other at a point along their circumferences shown within the broken line circle marked FIG. 5A. Guide block 66 has a channel 68 extending therethrough which receives a filamentary member 70, such as an optical fiber, for insertion into the substrate. Preferably, the filamentary member 70 is drawn from a spool (not shown) and is received within the channel 68 where it is guided between the nip rollers 56 and 58. FIG. 5A shows in detail the action of the nip rollers engaging the filamentary member 70 for feeding it to the insertion assembly. Guide block 66 has a gap 72 which exposes the filamentary member 70 to the mutually facing circumferential surfaces 74 and 76 of the nip rollers 56 and 58. Preferably these surfaces are formed from a compliant material layer 78 such as rubber and are in contact or spaced apart from each other so as to forcibly contact the filamentary member 70, draw it from its spool and force it through the channel 68 in guide block 66 when the nip rollers 56 and 58 are turned by the feed assembly motor 54. The compliant material layer 78 is used to prevent damage to the filamentary member 70 while insuring adequate purchase between it and the nip rollers to provide feeding of accurate lengths of the filamentary member precisely timed to coordinate with the components of the insertion assembly described below.

Figure 2A:
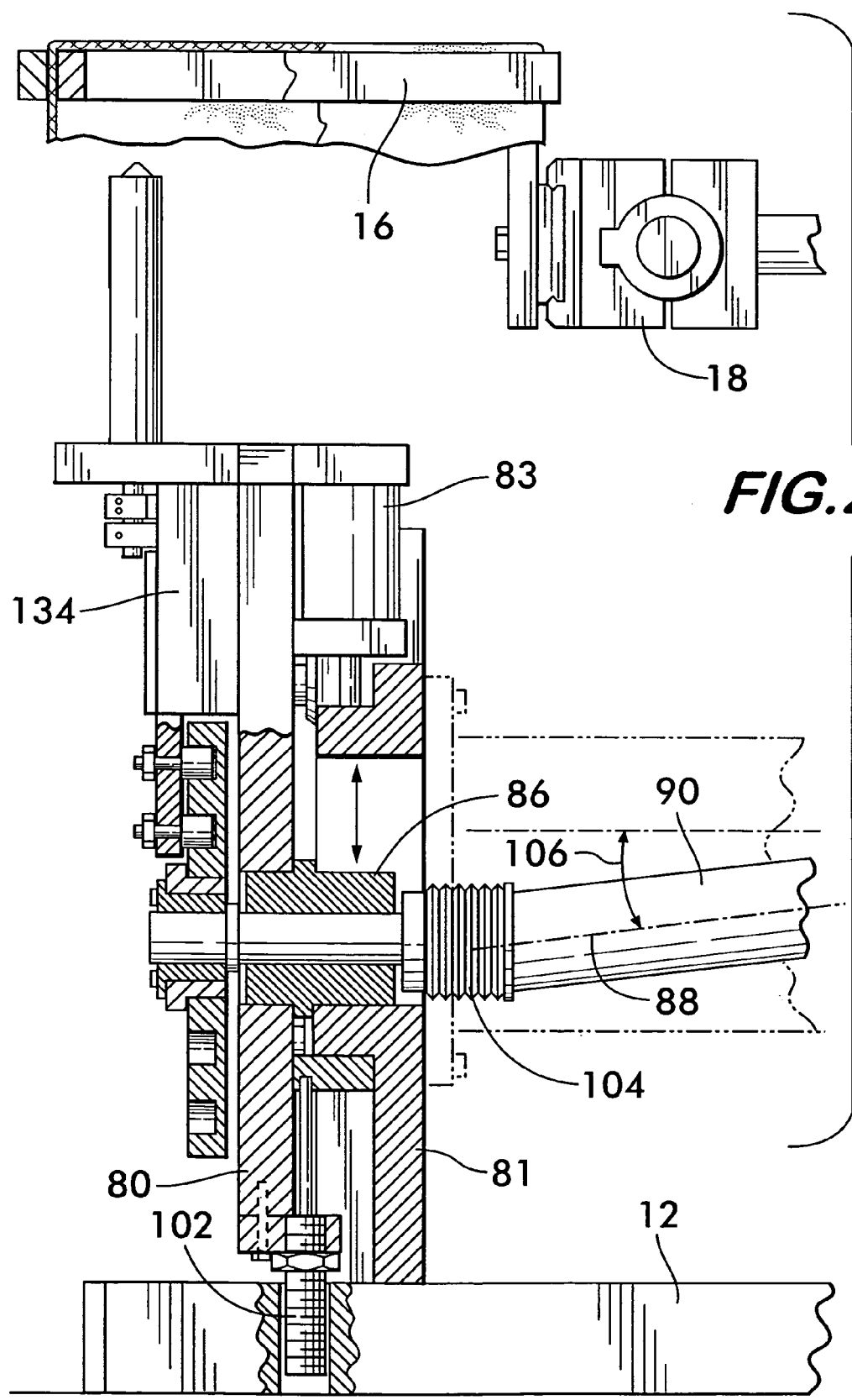
FIG. 2A is a partial sectional view taken at line 2A—2A of FIG. 1.

FIG. 1 shows a lower mounting plate 80 positioned beneath x-y table 16. A lower cam wheel 84 is mounted on the lower mounting plate. As best shown in FIG. 2, the lower cam wheel 84 is mounted in a bearing 86 attached to the lower mounting plate 80, the bearing 86 permitting rotation of the lower cam wheel 84 about an axis 88. Mounting plate 80 is slidably mounted on a block 81 attached to the base 12 and to stanchion 14 by a beam 82. Movement of the lower mounting plate 80 relative to block 81 is effected by an actuator, preferably a pneumatic cylinder 83 mounted on the lower mounting plate 80 and engaging the block 81. As shown in FIG. 2, extension of the pneumatic cylinder 83 positions the lower mounting plate in the operating position, and, as shown in FIG. 2A, retraction of the pneumatic cylinder 83 allows the lower mounting plate 80 and all components mounted thereon to move downwardly. To maintain a true orientation of the lower mounting plate 80 during and after adjustment, an elongated vertically oriented track 85 is mounted on the block 81. Track 85 is engaged by wheels 87 mounted on the lower mounting plate 80, engagement of the wheels and track guiding the motion of the lower mounting plate 80 relatively to the block 81.

A lower drive shaft 90 is connected to the lower cam wheel 84 and extends from bearing 86 to another bearing 92 mounted within the stanchion 14. A drive belt assembly 96 (shown in hidden line) is positioned within stanchion 14 and connects the lower drive shaft 90 to the upper drive shaft 40 so that both drive shafts and their respective lower and upper cam wheels 84 and 34 may be turned by motor 44. Flexible couplings 104 couple the lower drive shaft between the bearings 86 and 92 and allow the shaft to be readily adjusted through an angle 106 to accommodate the relative motion of the lower mounting plate 80 to the block 81 as illustrated by a comparison of FIGS. 2 and 2A. Adjusting the vertical position of lower mounting plate 80 by means of the pneumatic actuator 83 permits precise, adjustable positioning of the filamentary member insertion assembly (described below) as well as the ability to more easily position a substrate between the components of the insertion assembly by separating its components. A shock absorber 102 is adjustably mounted on the lower mounting plate 80 and engages the block 81. The shock absorber 102 is adjustable, for example by means of a screw thread and jam nut, and damps the relative motion between the lower mounting plate 80 and the block 81 when the lower mounting plate is moved by the pneumatic actuator 83.

As best shown in FIG. 3, lower cam wheel 84 comprises two lower cams 98 and 100, defined by cam surfaces which appear respectively as non-circular grooves 98a and 10a in the lower cam wheel 84. Cams 98 and 100 rotate about respective axes of rotation 88a and 88b, best shown in FIG. 2. The axes coincide with one another and with the axis 88 of the lower cam wheel 84 since both cams 98 and 100 are mounted on the cam wheel 84. However, the cams could also be independently mounted, in which case the axes of rotation might not be coincident. As described below, cam followers of various reciprocating components of the filamentary member insertion assembly ride in the grooves 98a and 100a, the shape of the grooves and their angular relation to one another as well as their relation to grooves 48a and 50a on the upper cam wheel 40 coordinating the relative movements of the reciprocating components of the filamentary member insertion assembly.

The filamentary member insertion assembly 108 is shown in FIGS. 1 and 3 and comprises an upper unit 110 and a lower unit 112. It should be noted that the relative placement of the various components, as well as their description as "upper" or "lower", is arbitrary and made for the sake of convenience and illustration only, it being understood that a practical apparatus may be assembled using the components in any one of many different configurations and still remain within the scope of the invention, the configuration shown and described being the preferred embodiment but by no means presenting any limitation on the invention.

Figure 6A:
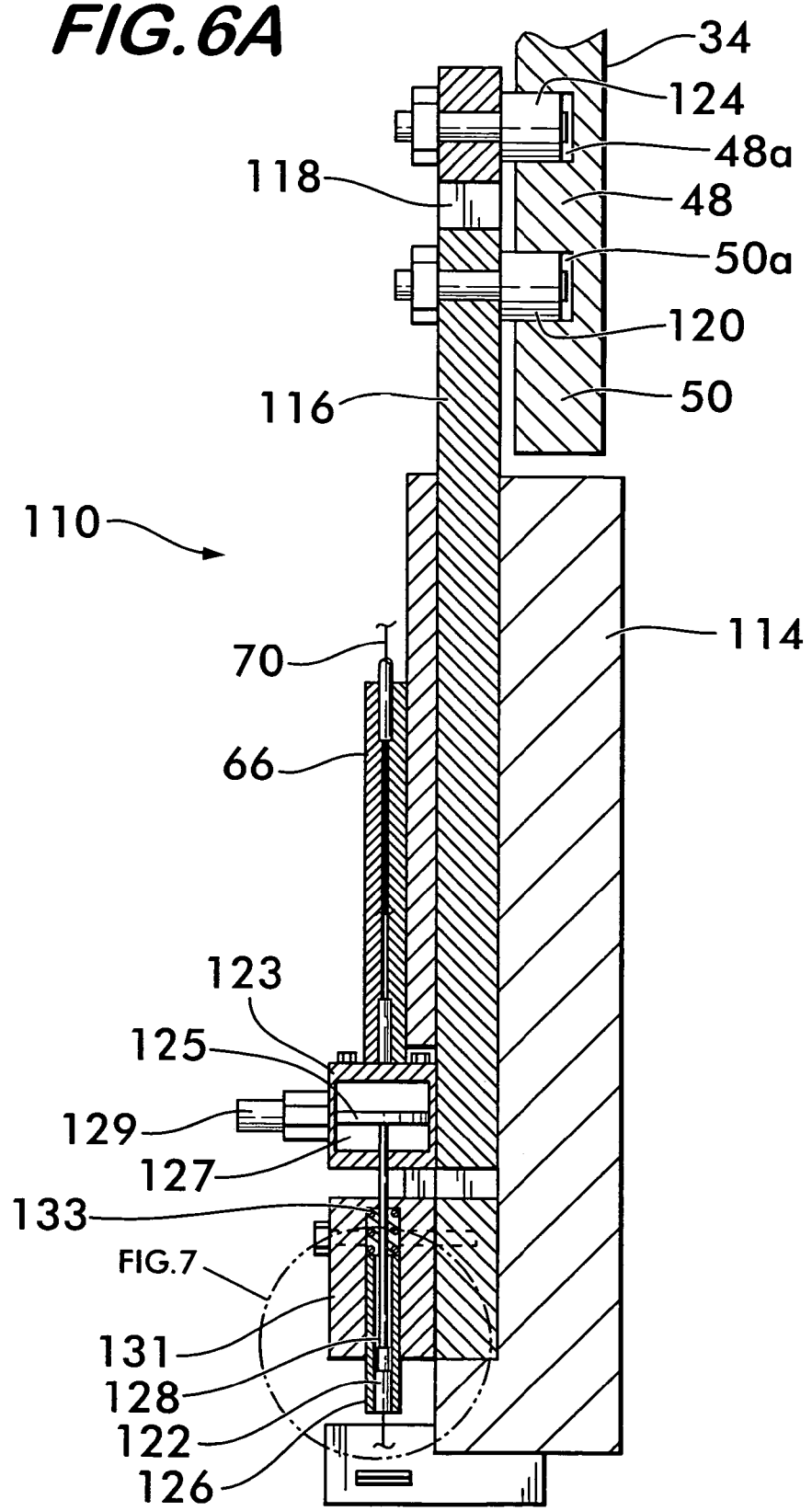
FIGS. 6A and 6B are partial sectional views taken at line 6—6 in FIG. 3.

Upper unit 110 comprises an upper bearing block 114 mounted on the upper mounting plate 30 between the upper cam wheel 34 and the x-y table 16. Upper bearing block 114 receives and guides two slider bars 116 and 118 in reciprocal motion relatively to one another and to the x-y table 16. As best shown in FIG. 6A, slider bar 116 has a cam follower 120 at its upper end which engages cam 50 (groove 50a) in the upper cam wheel 34. The lower end of slider bar 116 is attached to a swaging tool 122 which is used to fix the filamentary member to the substrate. Thus, the shape of cam 50 will determine the timing and extent of the reciprocal motion of the swaging tool 122. The swaging tool 122 is offset from the slider bar 116 for positioning beneath the guide block 66 of the filamentary member feeding assembly 52 so that the filamentary member 70 may be fed downwardly through the swaging tool as described below.

Preferably, swaging tool 122 is mounted on slider bar 116 via a biasing spring 123. Spring 123 allows limited vertical motion of the swaging tool and biases it toward the substrate 26. Use of a biasing spring 123 to mount the swaging tool 122 allows the swaging tool to accommodate substrates of different thickness without adjustment and ensures that the swaging tool will engage the substrate with substantially the same force regardless of the substrate thickness. In order to ensure constant force engagement across a range of substrate thicknesses, it is preferred that biasing spring 123 be an air spring comprising a piston 125 movable within a cylinder 127. The pressure within the cylinder may be adjusted to provide a particular spring rate for a substrate of a particular thickness by injecting compressed air through nipple 129. This may be accomplished manually or automatically during machine operation by the control unit 158.

FIG. 6A also shows slider bar 118 which has a cam follower 124 at its upper end. Cam follower 124 engages cam 48 (groove 48a) in the upper cam wheel 34. Note that slider bar 116 is configured to fit within slider bar 118 so as to have the same line of action and conveniently engage the upper cam wheel 34. The lower end of slider bar 118 is attached to a stripper tube 126 which is used to separate the swaging tool from the substrate during the insertion of the filamentary member 70. Stripper tube 126 is slidable within a mounting block 131 attached to the slider bar 118 and is spring biased toward the substrate 26 by a biasing spring 133. The stripper tube 126 is biased so that it may accommodate substrates of various thicknesses without adjustment but still engage the substrate with sufficient force to perform its functions which are to force the substrate down over a penetrating needle (described below) and to separate the substrate from the swaging tool after it has performed a swaging operation, also described below. The stripper tube 126 is offset from the slider bar 118 and has a lengthwise bore 128 which receives the swaging tool 122. The shape of cam 48 will determine the timing and extent of the reciprocal motion of the stripper tube 124, and together, cams 48 and 50 determine the relative motion of the swaging tool 122 and the stripper tube 126 to one another.

Figure 7:
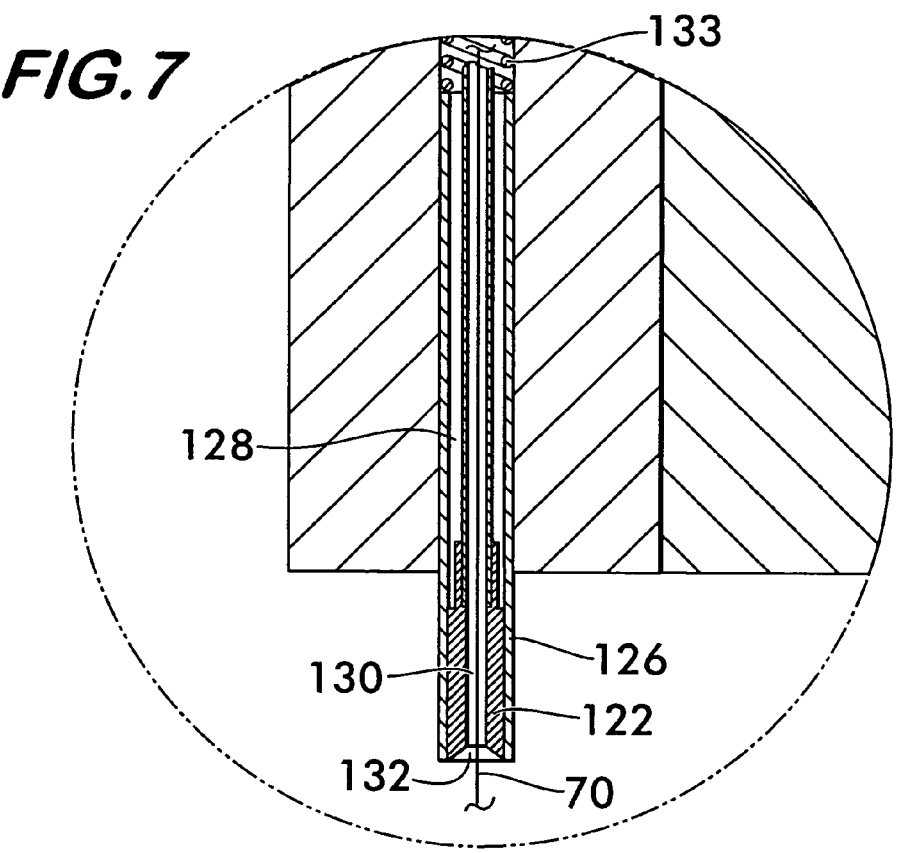
FIG. 7 is a view on an enlarged scale of a portion of the apparatus shown within the broken circle 7 in FIG. 6A.

FIG. 7 shows the stripper tube 126 and the swaging tool 122 in detail. As described above, swaging tool 122 moves reciprocably within the bore 128 of the stripper tube 126 and has a lengthwise passageway 130 which receives the filamentary member 70 from the channel 68 of guide block 66. Swaging tool 122 has a swaging surface 132 at one end, the swaging surface preferably having a concave conical shape for performing a swaging operation when engaged with the substrate as described below.

Figure 6B:
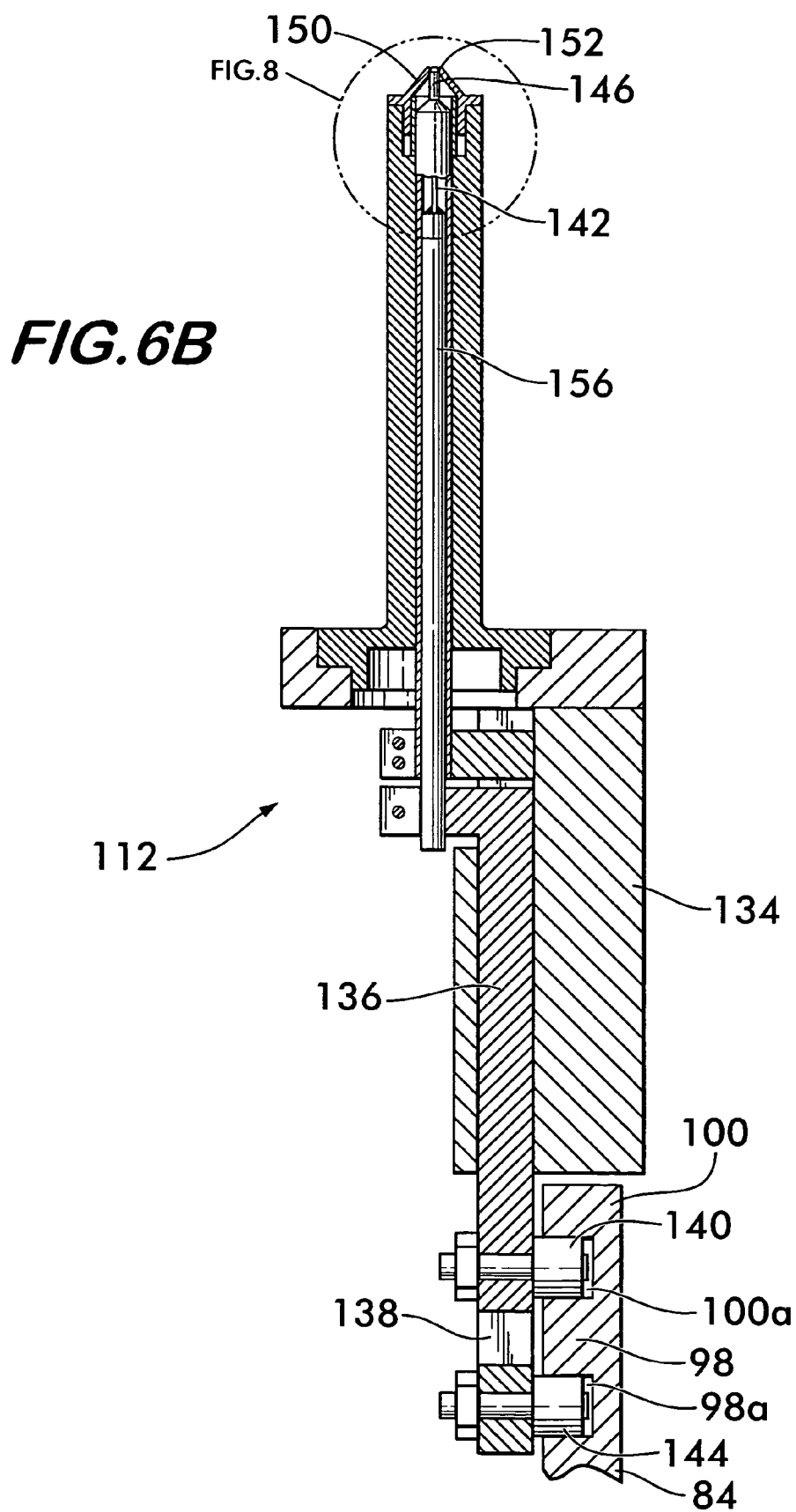

As shown in FIG. 3, the lower unit 112 of the filamentary member insertion assembly 108 comprises a lower bearing block 134 mounted on the lower mounting plate 80 between the lower cam wheel 84 and the x-y table 16. Lower bearing block 134 receives and guides two slider bars 136 and 138 in reciprocal motion relatively to one another and to the x-y table 16. As best shown in FIG. 6B, slider bar 136 has a cam follower 140 at its lower end which engages cam 100 (groove 100a) in the lower cam wheel 84. The upper end of slider bar 136 is attached to a needle 142 which is used to penetrate the substrate during insertion of the filamentary member. Thus, the shape of cam 100 will determine the timing and extent of the reciprocal motion of the needle 142. The needle 142 is offset from the slider bar 136 for aligning the needle with the bore 128 of the stripper tube 126 in the upper unit 110 of the filamentary insertion assembly 108.

Figure 8:
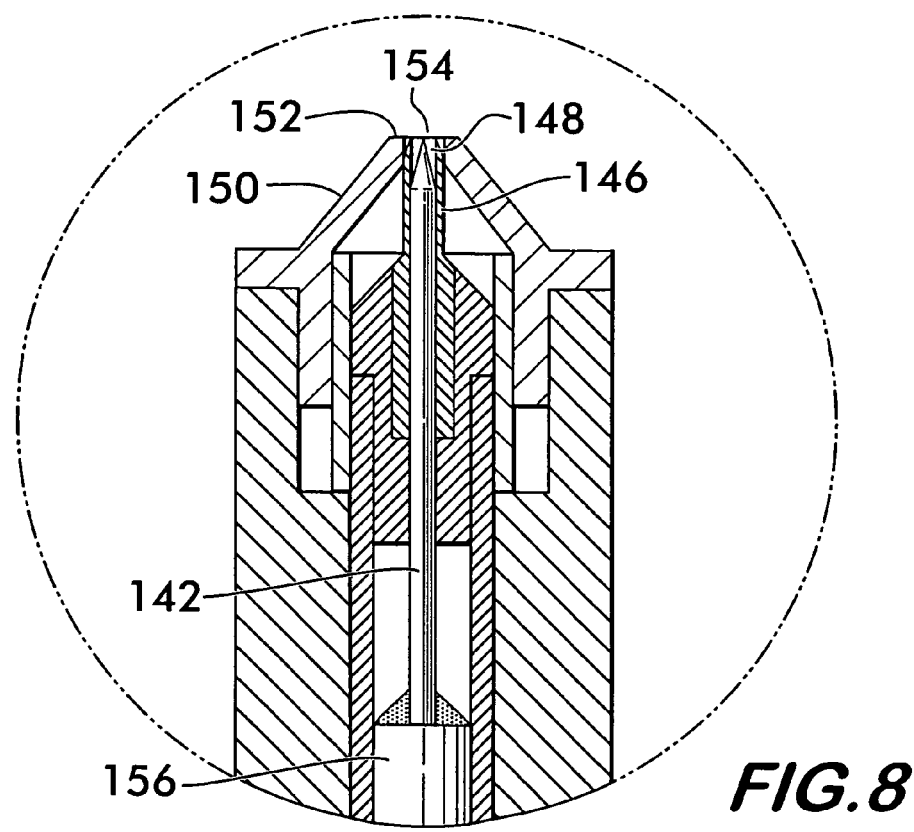
FIG. 8 is a view on an enlarged scale of a portion of the apparatus shown within the broken circle 8 in FIG. 6B.
Figure 9:
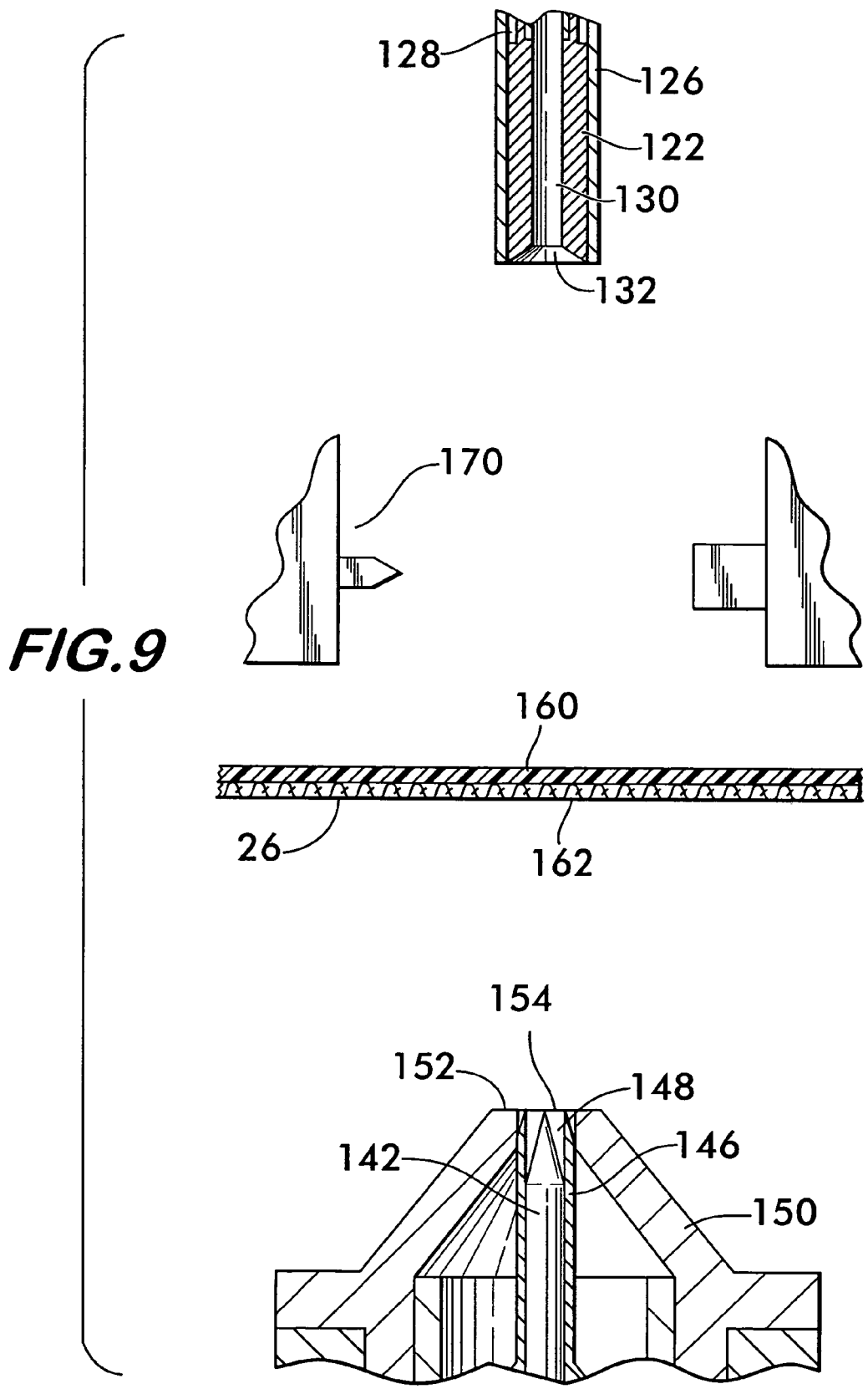
FIGS. 9–14 show a series of views depicting the operation of the apparatus shown in FIG. 1.

FIG. 6B also shows slider bar 138 which has a cam follower 144 at its lower end. Cam follower 144 engages cam 98 (groove 98a) in the lower cam wheel 84. Note that slider bar 136 is configured to fit within slider bar 138 so as to have the same line of action and conveniently engage the lower cam wheel 84. The upper end of slider bar 138 is attached to an outer sleeve 146 which is used to guide the filamentary member into an opening in the substrate formed by needle 142 during the attachment of the filamentary member to the substrate. As shown in FIG. 8, outer sleeve 146 has a lengthwise bore 148 for receiving needle 142 and is offset from the slider bar 138 so as to align bore 148 with needle 142. The shape of cam 98 will determine the timing and extent of the reciprocal motion of the outer sleeve 146, and together, cams 98 and 100 determine the relative motion of the needle 142 and the outer sleeve 146 to one another.

As shown in FIG. 6B, an anvil 150 is mounted on the lower bearing block 134. Preferably, anvil 150 is fixed relatively to swaging tool 122, stripper tube 126, needle 142 and outer sleeve 146 and has a support surface 152 which faces the substrate. FIG. 8 shows the anvil 150, the needle 142 and the outer sleeve 146 in detail. As described above, needle 142 moves reciprocably within the bore 148 of the outer sleeve 146, and both the outer sleeve and the needle move relatively to the anvil 150. An aperture 154 through the support surface 152 is aligned with the needle 142 and the outer sleeve 146 allowing these components to extend outwardly from the anvil 150 during their reciprocal motion and penetrate the substrate as described below. Preferably, both the needle 142 and the outer sleeve 146 are heated by an electrical resistance heater 156 to which the needle 142 is mounted. As shown by a comparison of FIGS. 7 and 8, the bore 128 of stripper tube 126, the passageway 130 of swaging tool 122, the needle 142, the bore 148 of outer sleeve 146 and the aperture 154 through anvil 150 are all coaxially aligned.

Figure 4:
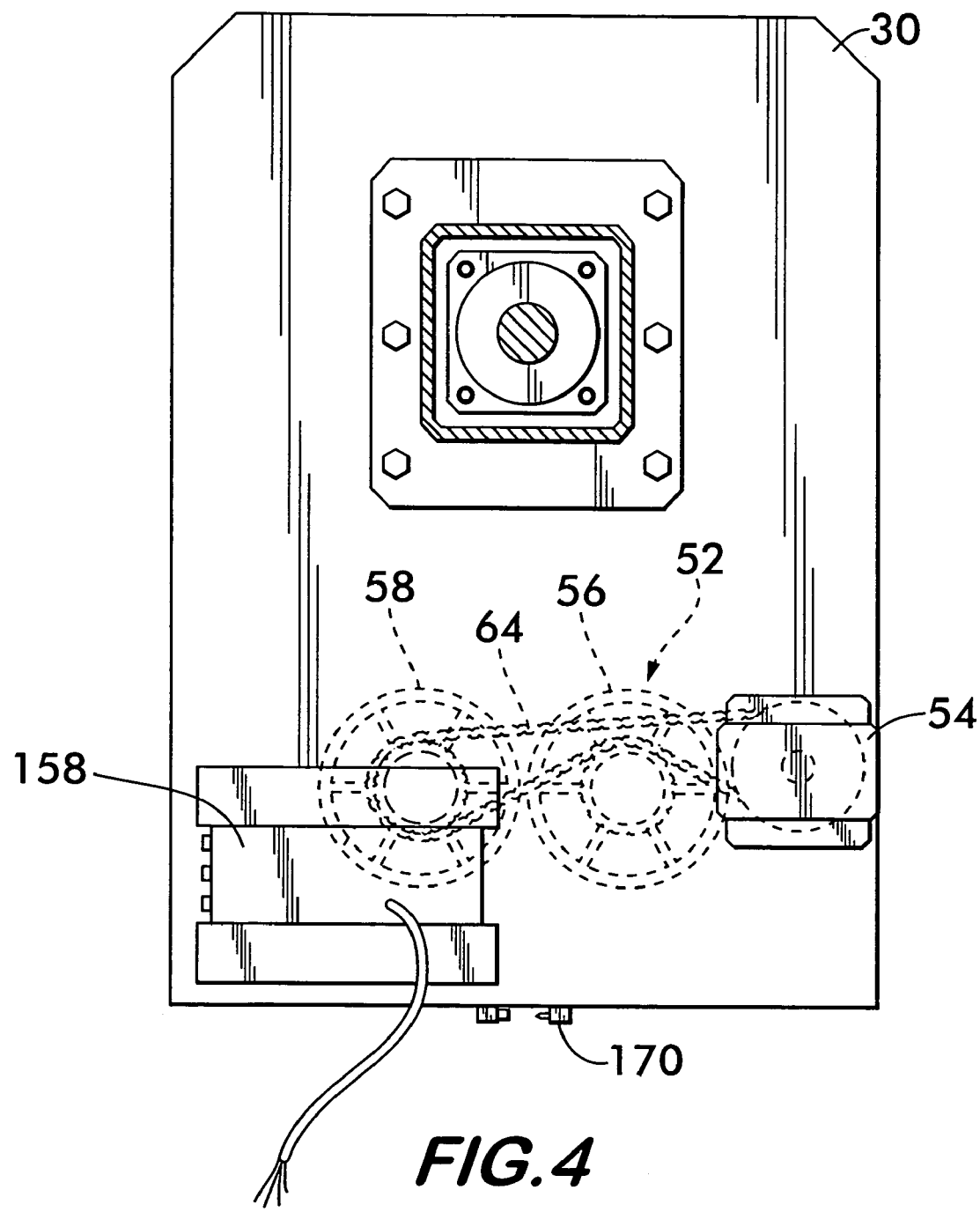
FIG. 4 is a partial sectional view taken at line 4—4 of FIG. 2.

Preferably, the actions of the motor 44 driving the cam wheels 34 and 84, the motor 54 driving the filamentary member feed assembly 52 and the x- and y-direction actuators 18 and 20 for positioning the x-y table 16 are under the control of a control unit 158, shown mounted on the upper mounting plate 30 in FIGS. 1 and 4. Control unit 158 is preferably microprocessor based and programable so as to be able to operate the apparatus for inserting filamentary members 70 in a desired pattern in a substrate 26 by moving the x-y table 16 via actuators 18 and 20 to position a desired location on the substrate between the anvil 150 and the stripper tube 126 and then activate motors 44 and 54 to drive the cams moving the upper and lower insertion units 110 and 112 of the filamentary member insertion assembly 108 as well as the filamentary member feed assembly 52 in a coordinated manner so as to effect attachment of the filamentary member to the substrate at the desired location. The substrate 26 may be, for example, an article of clothing such as a hat or a jacket and the filamentary members 70 may be optical fibers positioned with free ends extending through an outer surface of the clothing to display particular patterns and colors when illuminated.

Apparatus Operation

FIGS. 9 through 14 present a series of views illustrating the operation of apparatus 10. Starting with FIG. 9 (and with reference also to FIG. 1), the control unit 158 has commanded the x- and y-actuators 18 and 20 to move substrate 26, held in tentering frame 28, to position a predetermined location on the substrate between anvil 150 and stripper tube 126. The substrate comprises a plastic layer 160, preferably formed from a material and having a thickness suited to the particular application at hand. Thermoplastics which take on a set after heating and cooling are preferred. In particular, polyvinylchloride is favored because it is inexpensive and can be obtained in a wide range of hardnesses, from a relatively stiff formulation to provide reinforcement to the substrate, to a soft, compliant, almost gelatinous layer which does not significantly affect the flexibility or "hand" of the fabric with which it is used. Other plastics, such as polystyrene are also feasible. The plastics may be heated directly as by the heated needle 142 or heated by pressure, as when the plastic layer is compressed as described below. Pressure set plastics are also feasible. The substrate may also include one or more additional layers 162. Additional layers 162 may be other plastic layers, membranous or woven, knitted or braided textiles as well as non-woven felts and may be formed of synthetic or natural materials such as continuous sheet material, fibers, yarns and the like. Although it is preferred to laminate the plastic layer 160 to the additional layer 162, it is not necessary to do so for attaching the filamentary member to the substrate since the process of attaching the filamentary member to the substrate also attaches the layers 160 and 162 to one another. It is also preferred to position the substrate 26 with the plastic layer facing the swaging tool 122 for reasons explained below. Note that in the initial configuration shown in FIG. 9 the upper cam wheel 34 assumes a position wherein cams 48 and 50 position the swaging tool 122 and the stripper tube 126 away from the substrate 26. Similarly, lower cam wheel 84 assumes a position wherein cams 98 and 100 position the needle 142 and the outer sleeve 146 beneath the support surface 152 of the anvil 150 within the aperture 154. The filamentary member feed assembly 52 is quiescent at this time in the apparatus operation.

Figure 10:
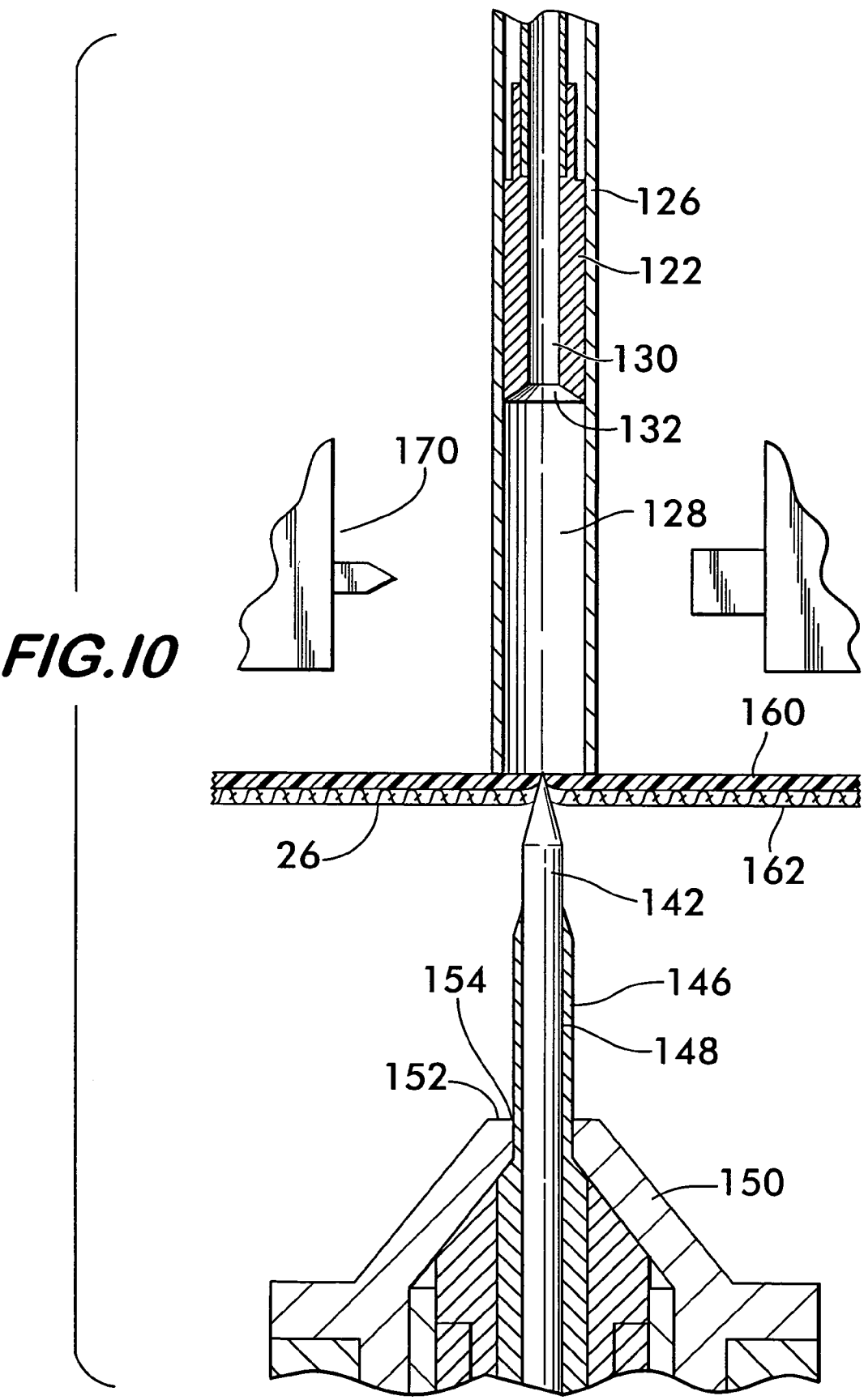

In FIG. 10, the control unit 158 has rotated the lower cam wheel 84 which advances both the needle 142 and the outer sleeve 146 upwardly through aperture 154 from beneath support surface 152 and into engagement with the substrate 26. The upper cam wheel 34 is also rotated, moving the stripper tube 126 downwardly independently of the swaging tool 122, the end of the stripper tube engaging the substrate 26. The stripper tube 126, being spring biased as described above, is self-adjusting and engages the substrate 26 regardless of its thickness.

Figure 11:
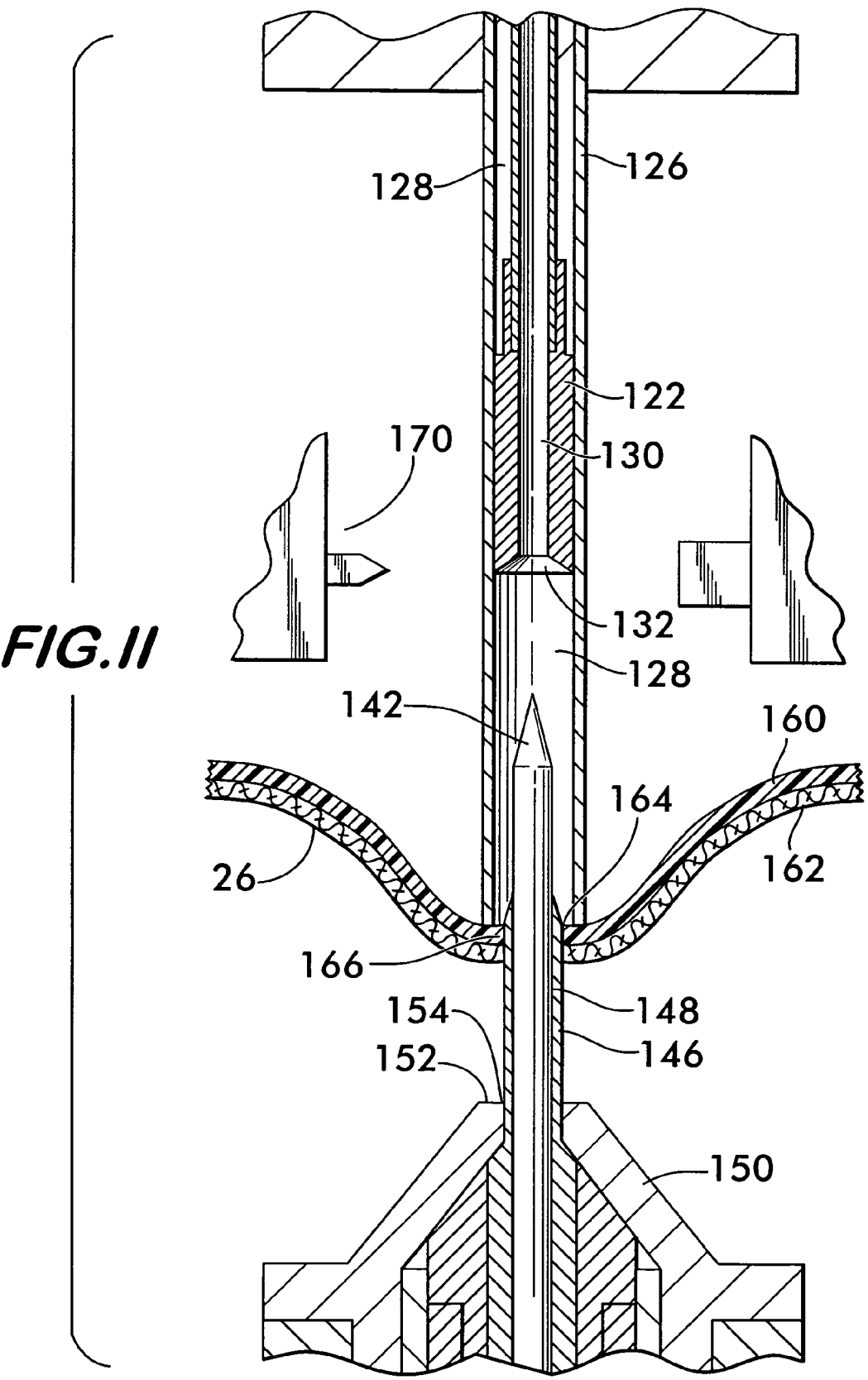

As shown in FIG. 11, the stripper tube 126 is advanced downwardly by further rotation of the upper cam wheel 34 causing the needle 142 and the outer sleeve 146 to penetrate the substrate 26 and form an opening 164 therein. Both the needle 142 and the outer sleeve 146 are preferably heated to a temperature appropriate to melt a portion 166 of the plastic layer 160 surrounding opening 164 for reasons described below. Note that the needle 142 and the outer sleeve 146 are received within the bore 128 of stripper tube 126.

Figure 12:
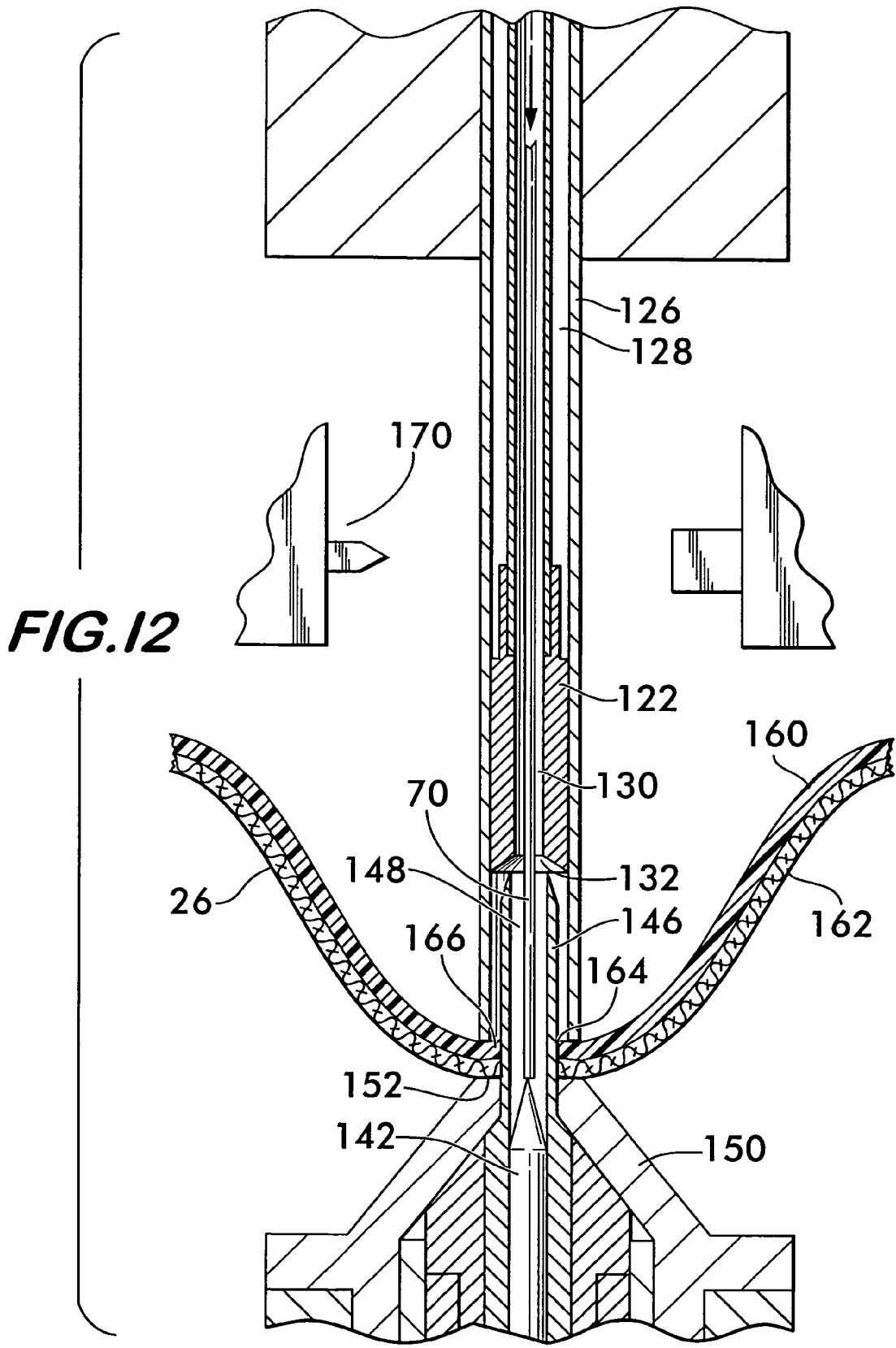

As shown in FIG. 12, appropriate further rotation of the upper and lower cam wheels 34 and 84 causes needle 142 to retract beneath the anvil support surface 152 and advance the swaging tool 122 into proximity with the outer sleeve 146. The passageway 130 of the swaging tool 122 aligns with the bore 148 of the outer sleeve 146 and the control unit 158 commands motor 54 to spin nip rollers 56 and 58, drawing filamentary member 70 from its spool (not shown) and advance it downwardly, through channel 68 in guide block 66, through passageway 130 in the swaging tool 122 (see also FIGS. 1, 5, 5A and 6A) and into outer sleeve 146 until it extends into or through opening 164 in the substrate 26. Note that it is convenient, but not necessary, to have the outer sleeve 146, which acts as a guide to ensure that the filamentary member 70 is positioned reliably within the opening 164. The aforementioned cam wheel rotation also advances the stripper tube 126 which forces the substrate 26 into contact with the support surface 152 on anvil 150.

Figure 13:
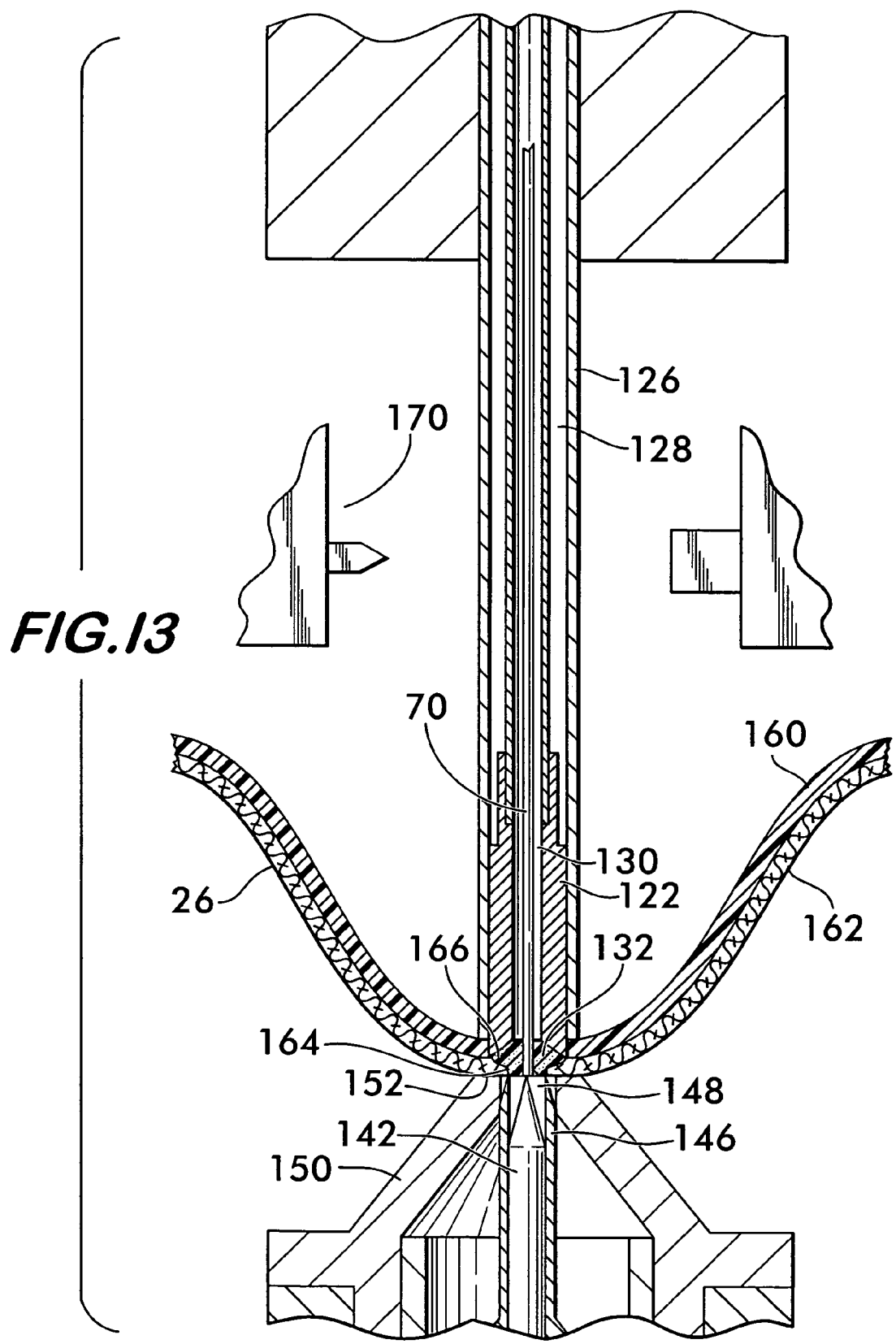

As shown in FIG. 13, further rotation of the cam wheels 34 and 84 under the direction of the control unit 158 causes the outer sleeve 146 to retract beneath the anvil support surface 142, thus leaving the filamentary member 70 within the opening 164 in substrate 26. The swaging tool 122 is advanced in the wake of the retreating outer sleeve to engage the swaging surface 132 with the substrate 26, preferably against the plastic layer 160. The swaging tool 122 compresses the substrate 26 against the anvil support surface 152 with substantially constant force and regardless of the substrate thickness due to the biasing action of the air spring on which the swaging tool is mounted as previously described. The swaging surface 132 deforms the portion 166 of the plastic layer 160 surrounding the opening 164 into contact with the filamentary member 70, thus attaching it to the substrate as well as attaching layers 160 and 162 together. By virtue of the concave conical shape of the swaging surface 132, the plastic layer portion 166 is formed into a complementary conical shape which provides for a secure attachment of the filamentary member 70 to the substrate 26 with a relatively high pull-out strength. It is preferred to heat the needle 142 and the outer sleeve 146, especially when the filamentary member 70 is an optical fiber. The heated needle melts the plastic portion 166 which then partially melts and fuses with the cladding layer typically found on optical fibers as the portion 166 is swaged. This fusing of the plastic with the cladding layer yields a high strength attachment of fiber to substrate. Melting of the plastic layer is also advantageous with other types of filamentary members 70 as the melted plastic portion 166 will fuse to both the filamentary member and the layer 162 when swaged to create a strong bond. It is also possible to cold work the plastic, i.e., swage the plastic portion 166 into contact with the filamentary member 70 without first heating it, to obtain an acceptable bond, the attachment depending upon friction and interference between the plastic and the filamentary member, or the plastic being melted by compressing it between the swaging tool 122 and the anvil support surface 152.

Figure 14:
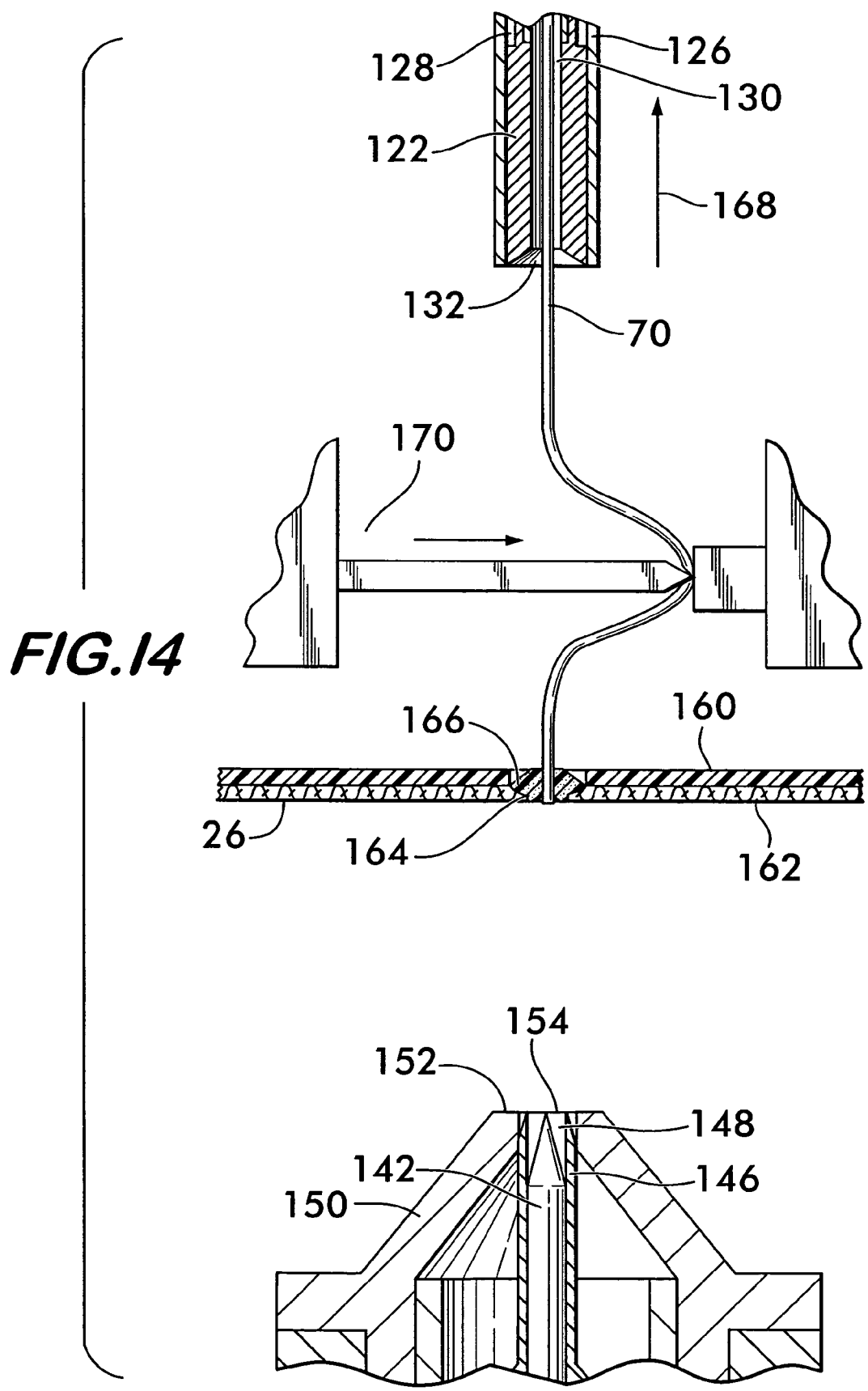

FIG. 14 shows the next step in the process whereby rotation of the upper cam wheel 34 first moves the swaging tool 122 out of engagement with the substrate 26. The stripper tube 126 is maintained in its position, holding the substrate 26 against the anvil support surface 152 to ensure that the swaging tool separates cleanly from the substrate, there sometimes being a tendency for the substrate to adhere to the swaging surface 132. Next the stripper tube 126 is moved upwardly out of engagement with substrate 26 as indicated by arrow 168. Further length of filamentary member 70 may be fed as desired by the feed assembly 52, and the control unit 158 commands a cutting blade assembly 170 into action to sever the filamentary member 70. Cutting blade assembly 170 is preferably mounted on the upper mounting plate 30 between the stripper tube 126 and the x-y table 16 as shown in FIG. 3. The apparatus is then ready to repeat the process by repositioning the substrate to a new location for the next attachment.

The apparatus according to the invention permits filamentary members such as optical fibers to be attached to substrates precisely, rapidly, repeatedly and reliably, the fibers being held securely in the substrate against significant pull-out forces. Although a specific embodiment is shown and described above, variations on the details of the constriction and operation of the apparatus are contemplated which do not depart from the scope of the invention. The x- and y-direction actuators which move the x-y table are preferably electro-mechanical but could also be pneumatic or hydraulically driven. Although cams are preferred to coordinate and control the relative movements of the stripper tube, swaging tool, needle and outer sleeve comprising the insertion assembly, these components could also be moved by means of stepper motors, hydraulic or pneumatic actuators or solenoids controlled by the control unit. Similarly, the nip rollers forming the feeding assembly also could be directly driven by separate motors under the command of the controls system. While the swaging surface is preferably conical, it is not limited to that shape, and could, for example, be hemi-spherical or another practical shape which promotes swaging of the plastic layer. Furthermore, the motion of the various components is relative and, thus, which components move and which components are stationary is largely a matter of detailed practical design.

What is claimed is:

1. A substrate comprising a plastic layer, and an optical fiber extending transversely through said substrate and attached thereto by deforming a portion of said plastic layer surrounding said optical fiber into contact with said optical fiber.

2. A substrate according to claim 1, wherein said portion of said plastic layer is deformed into a conical shape surrounding said optical fiber.

3. A substrate according to claim 1, wherein said optical fiber is oriented substantially perpendicular to said substrate.

4. A substrate according to claim 1, further comprising a textile material laminated with said plastic layer.

5. A substrate according to claim 4, wherein said textile material is selected from the group consisting of woven, knitted and braided textiles.

6. A substrate according to claim 4, wherein said textile material comprises a felt.

7. A substrate according to claim 1, wherein said deformed portion of said plastic layer is fused to said optical fiber.

8. A substrate according to claim 7, wherein said portion of said plastic layer is deformed into a conical shape surrounding said optical fiber.

9. A substrate according to claim 7, wherein said optical fiber has an outer cladding layer and said deformed portion of said plastic layer is fused with said cladding layer.

10. A substrate according to claim 9, wherein said portion of said plastic layer is formed into a conical shape surrounding said optical fiber.

11. A substrate according to claim 1, further comprising a frictional bond formed between said deformed portion of said plastic layer and said optical fiber.

* * * * *